Figure 1:
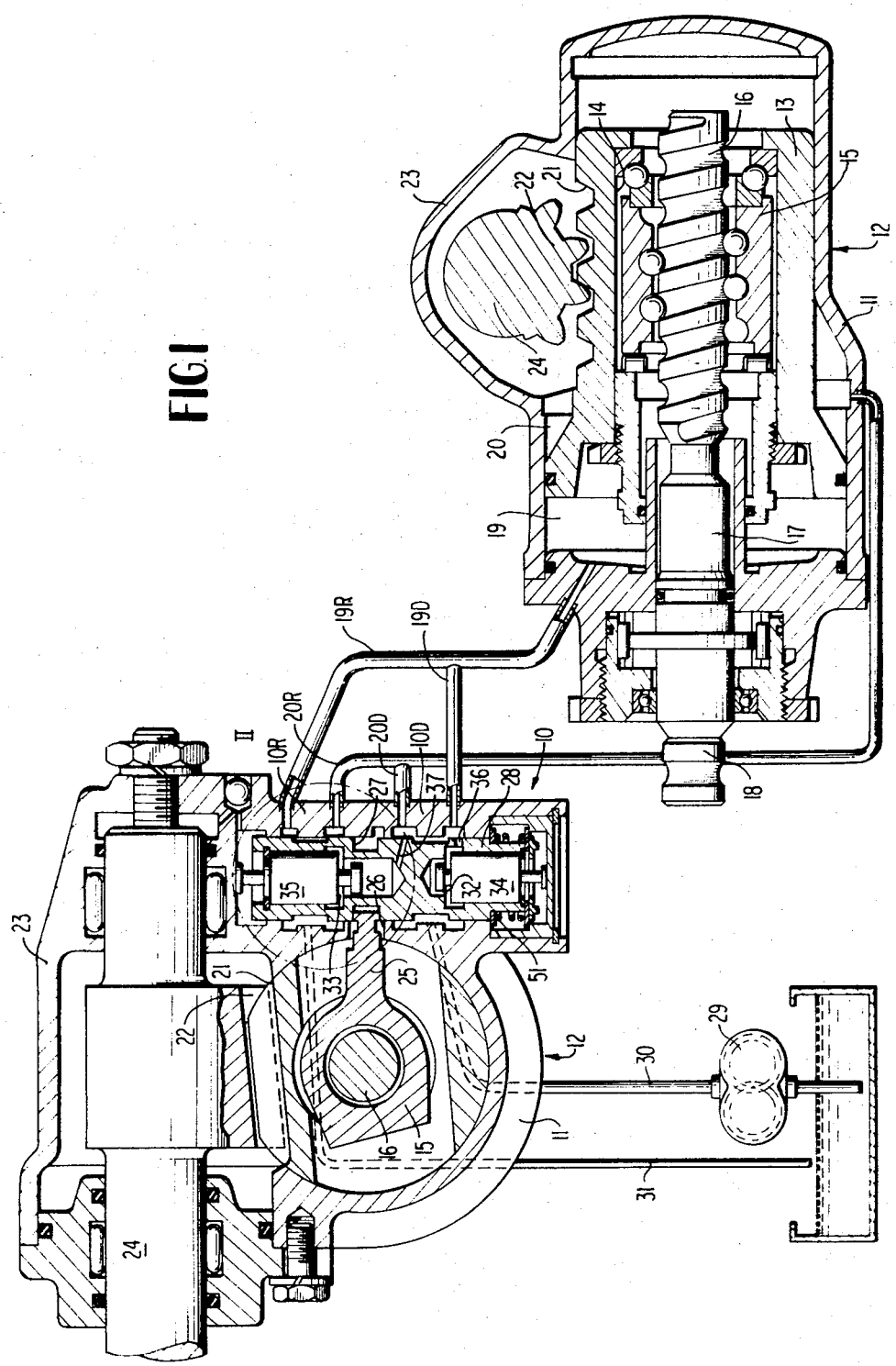

United States Patent
Katz et al.

[11] 3,719,124
[45] March 6, 1973

[54] SERVO-STEERING SYSTEM FOR VEHICLES

[75] Inventors: Klaus Katz; Manfred Bulow, both of Stuttgart, Germany

[73] Assignee: Daimler-Benz Aktiengesellschaft, Stuttgart-Unterturkheim, Germany

[22] Filed: March 1, 1971

[21] Appl. No.: 119,720

[30] Foreign Application Priority Data

Feb. 28, 1970 Germany .................... P 20 09 574.3

[52] U.S. Cl. .................................................. 91/434
[51] Int. Cl. ............................................... F15b 13/14
[58] Field of Search ........ 91/434, 370, 371, 372, 373; 137/625.69

[56] References Cited

UNITED STATES PATENTS

| 2,778,627 | 1/1957 | Sands | 92/52 X |
| 2,922,440 | 1/1960 | Hardy et al. | 91/434 X |
| 2,985,145 | 5/1961 | Foerster et al. | 91/373 |
| 3,444,785 | 5/1969 | Katz et al. | 91/434 |
| 3,444,786 | 5/1969 | Forster et al. | 91/434 |

Primary Examiner—Martin P. Schwadron
Assistant Examiner—Irwin C. Cohen
Attorney—Craig & Antonelli

[57] ABSTRACT

A servo-steering system for vehicles with a servomotor assisting the manual force at the steering wheel which is controlled by way of a control slide valve in dependence on a transmitter element responding to the movements of the steering wheel; a reaction pressure derived from the load pressure and counteracting the manual force is rendered effective between the valve spool and a respective reaction piston supported against the valve housing; the reaction piston consists of a first piston part that is adapted to be supported fixedly at the valve spool and elastically at the valve housing, and of a second piston part movable relative to the first piston part, which is adapted to be supported against the valve housing by elastic means; after overcoming the elastic means for the second piston part, the latter is fixedly supported at the valve spool by the reaction pressure.

25 Claims, 4 Drawing Figures

INVENTORS
KLAUS KATZ
MANFRED BÜLOW

BY Craig, Antonelli, Stewart & Hill
ATTORNEYS

SERVO-STEERING SYSTEM FOR VEHICLES

The present invention relates to a servo-steering for vehicles with a servo-motor assisting the manual force at the steering wheel, which is controlled by way of a control slide valve in dependence on a transmitter member responding to the movements of the steering wheel, and in which a reaction pressure derived from the load pressure and acting opposite the manual force, is rendered effective between the control slide member or valve-spool and a respective reaction piston supporting itself against the valve housing, and in which the reaction piston includes a first piston part with a piston pressure surface adapted to be acted upon by the reaction pressure, which is adapted to be supported directly and rigidly at the control slide valve member and with respect to the valve housing by way of elastic means, as well as a second piston part displaceable with respect to the first piston part and adapted to be supported with respect to the valve housing, which is provided with a piston pressure surface also adapted to be acted upon by the reaction pressure.

In the servo-steering system of this type, disclosed in the German Auslegeschrift 1,291,226, corresponding to U.S. patent application Ser. No. 646,836, filed June 19, 1967, and assigned to the assignee of the instant application, now U.S. Pat. No. 3,444,785, elastic means are interconnected between the two piston parts. One of the two piston parts is thereby adapted to be supported directly and rigidly at the control slide member or valve spool and the other piston part directly and rigidly at the valve housing. An operation results from this prior art arrangement such that after overcoming the spring prestress between the two piston parts, one of the two piston parts is fixedly supported at the control slide member or valve-spool, and as a result thereof the reaction pressure opposing the manual force increased, admittedly at a reduced rate though always proportional to the load pressure.

The present invention is based on two mutually exclusive tasks. At first, it is desired that the maximum manual force to be applied to the steering wheel does not exceed a predetermined amount. However, in particular, when driving through curves, it is advantageous that the manual force remains to be proportional to the load pressure even with still large steering shaft moments.

Starting with the known servo-steering system of the aforementioned type with two reaction piston parts movable relative to one another, the underlying problems are solved according to the present invention in a simple manner in that springy or elastic means are interconnected between the second piston part and the valve housing and in that the second piston part, after overcoming its elastic means, is fixedly supported at the control slide member or valve spool by the reaction pressure. The bend in the manual force curve for the reduced rise or increase of the manual force can be displaced according to the present invention into the range of smaller manual forces and smaller steering shaft moments so that the increase of the manual force in the ranges in proximity to the center position is relatively steep. According to the present invention, a second bend results in the manual force curve for the so-called manual force limitation as a result of the elastic support of the second reaction piston part. This second bend can be displaced into the range with relatively high steering shaft moments so that also with higher moments a proportional dependence of the manual force from the load pressure is still attainable. A relatively flat configuration of the manual force curve between the two points of the bends of the curve may thereby be provided in order to achieve a relatively small maximum manual force.

The servo-steering system described in the aforementioned German Auslegeschrift 1,291,230 does not fall within the concept of the definition of the present invention since in this prior art construction the reaction pressure force is completely turned off or disengaged at a predetermined point of the manual force curve and the further progress of the manual force is determined with increasing load pressure by so-called reaction springs. The reaction springs acting as housing support of the pot-shaped reaction piston are arranged on the inside of the piston pot. A relatively large guidance length for the reaction pistons with small structural length of the control slide member results, inter alia, from such an arrangement. In the application of the present invention to this prior art servo-steering system, the arrangement may be made in such a manner that the bottom of a piston pot which is open at its end surface facing the adjacent valve housing wall, is provided with a bore which connects the interior space of the piston pot with the associated reaction pressure space of the control slide member or valve speed, and in that the second rod-shaped piston pot is guided in this bore in a pressure-tight and displaceable manner.

It is advantageous for achieving a short structural length if the elastic means for the two piston parts are stacked "one within the other," i.e., are arranged in nested relationship. This arrangement can be realized in a simple manner in that the elastic means for the housing support of the first piston part and the elastic means for the housing support of the second piston part are connected in parallel.

In order to avoid that the two piston parts can be pushed apart during a pressure relief by the effect of the elastic means, according to a further feature and development of the present invention, the elastic means for the housing support of the second piston part may engage simultaneously at both piston parts in the normal unloaded rest position in which this piston part is not loaded by the pressure medium.

Accordingly, it is an object of the present invention to provide a servo-steering system for vehicles which avoids by simple means the aforementioned shortcomings and drawbacks encountered in he prior art.

Another object of the present invention resides in a servo-steering system which assures that a maximum manual force to be applied at the steering wheel is not exceeded.

A further object of the present invention resides in a servo-steering system of the type described above in which the manual force, in particular during curve drives remains proportional to the load pressure even at relatively large steering shaft moments.

Still another object of the present invention resides in a servo-steering system which is characterized by a manual force curve provided with two bends, with the bend for the reduced rise of the manual force being within the range of smaller manual forces while the bend for the so-called manual force limitation is within the range of relatively high steering shaft moment.

Still a further object of the present invention resides in a servo-steering system of the type described above which is simple in construction, compact as regards dimensions and requires relatively few parts that can be readily assembled.

Figure 2:
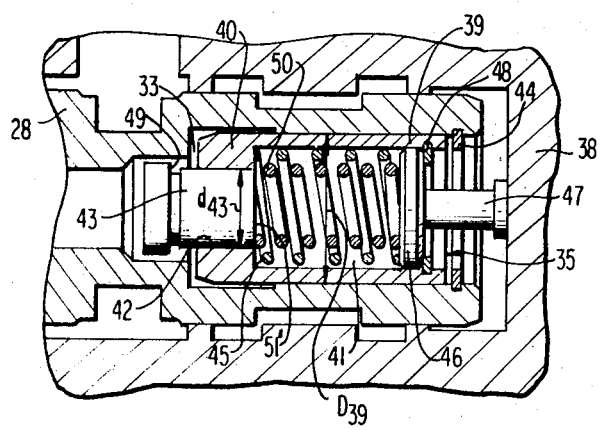
Figure 3:
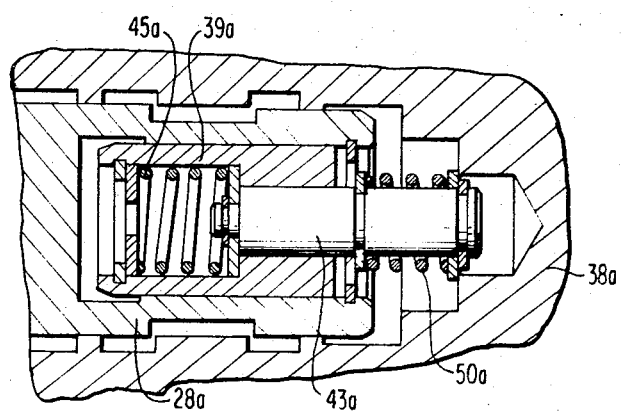
Figure 4:
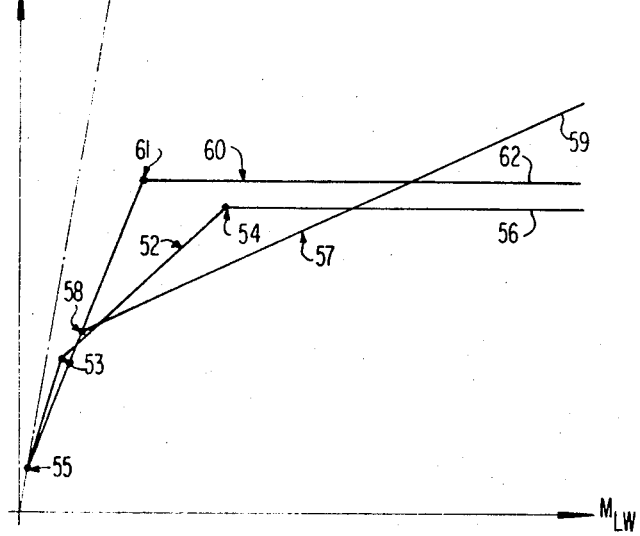

These and other objects, features, and advantages of the present invention will become more obvious from the following description when taken in connection with the accompanying drawing which shows, for purposes of illustration only, two embodiments in accordance with the present invention, and wherein:

FIG. 1 is a schematic shifting diagram for the operation of the control slide valve assembly of a servo-steering system in accordance with the present invention which includes an axial and radial cross-section through the steering gear housing to show the hydraulic interconnections of the various parts thereof, FIG. 2 is a partial cross-sectional view, on an enlarged scale, illustrating the part indicated in FIG. 1 by the dash and dot circle and designated by reference numeral II with the part rotated in FIG. 2 through 90°;

FIG. 3 is a partial cross-sectional view of an arrangement corresponding to FIG. 2 with a modification of the reaction piston thereof; and FIG. 4 is a diagram indicating the configuration of the manual force curve $M_H$ plotted against the steering shaft moment $M_{LW}$, in which the servo-steering system of the present invention is compared with two servo-steering systems belonging to the prior art.

Referring now to the drawing wherein like reference numerals are used throughout the various views to designate like parts, at first the operation of the control slide valve assembly generally designated by reference numeral 10 will be described by reference to FIG. 1. Within the housing 11 of the steering gear generally designated by reference numeral 12 is displaceably guided a working piston 13 that is provided with a central aperture 14, in which a steering nut 15 is rotatably but axially non-displaceably supported. The steering nut 15 is threadably connected with a steering worm 16 which includes a steering spindle part 17 extending through the housing 11 at the end face. The spindle pin 18 of the steering spindle part 17 on the outer side of the housing 11 serves for the non-rotatable connection of the steering worm 16 with the steering hand wheel (not shown), i.e., for the connection between these two parts to assure rotation in unison. The working spaces of the housing 11 for the pressure medium which are disposed on opposite sides of the working piston 13 are designated by reference numerals 19 and 20. A toothed rack profile 21 is provided at the circumference of the working piston 13 into which engages a toothed segment 22 of a steering shaft 24 rotatably supported in a housing bulge 23 of the steering gear 12.

The steering nut 15 is provided with a rigid radial control arm 25 which extends radially and movably in the circumferential direction through an opening 26 of the housing 11 and which pivotally engages without play in a circumferential groove of the control slide member or valve-spool element designated by reference numeral 28.

The control slide valve generally designated by reference numeral 10, which operates according to the principles of flow control, is operatively interconnected between the pressure medium pump indicated by reference numeral 29 and the working spaces 19 and 20, whereby the valve section 10D controls the connection between the pump pressure line 30 and the working spaces 19, 20 and the valve section 10R, the connection between the pump return line 31 and the working spaces 19, 20. The pressure medium connections between the working spaces 19, 20 and the pump pressure lines 30, on the one hand, are designated by reference numerals 19D and 20D while the connections between the working spaces 19, 20 and the pump return line 31 are designated by reference numerals 19R and 20R.

The control slide member of valve-spool element 28 includes two reaction pressure spaces 32 and 33, in which one multi-partite reaction piston each 34 and 35, respectively, is guided in a pressure-tight and displaceable manner. The reaction pressure space 32 is connected by way of a spool-valve channel 36 and by way of the pressure medium connection 19D with the working space 19. The other reaction pressure space 33 is in communication by way of a second spool-valve channel 37 as well as by way of the pressure medium connection 20D with the working space 20.

In the illustrated center position of the control slide member or valve spool element 28 corresponding to the position of the steering wheel for straight drive, a constant pressure flow through the control valve 10 from the pump pressure line 30 to the pump return line 31 is maintained by means of the communicating pressure medium connections 19D and 19R as well as 20D and 20R. Depending on steering wheel deflection, the control slide member or valve spool element 28 is deflected by means of the control arm 25 in the one or other direction out of its center position so that one working space is connected with the pump pressure line 30 and the other with the pump return line 31. A reaction pressure is thereby built up in the respective reaction pressure space connected with the pump line 30 by way of its working space, which counteracts the steering deflection force at the control slide member of spool-valve element 28 and which becomes noticeable at the steering wheel as reaction force. The control slide or spool-valve member 28 is retained in its center position by a centering spring 51 supported at its two ends both against the valve housing as well as against the control slide or spool-valve member 28.

The construction of the reaction pistons according to the present invention will be described initially by reference to FIG. 2. The reaction piston generally designated by reference numeral 35—which is identical with the reaction piston 34—includes a piston skirt 39 open in the direction toward the adjacent valve housing wall 38, whose bottom 40 is provided with a bore 42 connecting the piston interior space 41 with the reaction pressure space 33. A plunger piston 43 is guided in the bore 42 in a pressure-tight and displaceable manner. The annularly shaped pressure surface of the piston skirt 39 adapted to be acted upon by the reaction pressure is radially delimited by the two diameters $D_{39}$ and $d_{43}$ whereas the circularly shaped pressure surface of the plunger piston 43 is determined by the diameter $d_{43}$ thereof. The piston skirt 39 is adapted to be fixedly supported at a retainer ring 44 inserted into the control slide or spool-valve member 28 and is adapted to be elastically supported at the valve housing wall 38 by means of a reaction spring 45. The reaction spring 45 abuts at one end at the bottom 40 of the piston pot 39 and at the other end at a support piston 46 displaceably supported in the interior space 41, whose piston rod 47 is brought into abutment against the valve housing wall 38. In order to absorb the prestress of the reaction spring 45, the support piston 46 abuts with its side opposite the spring at a retaining ring 48 inserted into the piston skirt 39. In order to be able to turn-off or render ineffectual the reaction pressure force of the plunger piston 43 according to the present invention, the plunger piston 43 is provided with an abutment edge 49 by means of which the plunger piston 43 is adapted to be rigidly supported at the bottom 40 of the piston skirt 39. A second inner compression spring 50 concentric to the reaction spring 45 is provided for the elastic support of the plunger piston 43, which is also provided according to the present invention, by means of which a second bend in the manual force curve is produced together with the cutting-off or disengagement of the pressure force and a certain limitation of the manual force is achieved; the spring 50 abuts at one end at the end face 51 of the plunger piston 43 opposite the reaction pressure space 33 and at the other end at the support piston 46. In order to be able to absorb the prestress of the pressure spring 50, the latter engages at the same time at the bottom 40 of the piston skirt 39. In this manner, the spring 50 is operatively connected in parallel to the reaction spring 45.

The operation of the reaction piston 35 corresponds to the manual force curve 52 with the two shifting points 53 and 54 shown in FIG. 4 and is obtained as follows:

Up to the point of overcoming the prestress of the centering spring 51, the manual force at the steering wheel is transmitted purely mechanically to the steering shaft 24. The corresponding portion of the curve in FIG. 4 is 0–55. The point 55 is the point where the pressure medium force is turned-on or rendered effective. A reaction force acts on the control slide or spool valve element 28 within the range 55–53 of the manual force curve, which is equal to the product of reaction pressure in the space 33 times the circular surface with the dimensions $D_{39}$ as its diameter. This means, the piston parts 39 and 43 form a part rigid in itself by the effect of the spring 50. As a result thereof, the shape of the curve portion 55—53 is relatively steep so that the steering in the neighborhood of the center position of the steering wheel produces already a noticeable contact with the road.

At the point 53 of the manual force curve, the prestress of the springs 45 and 50 is overcome by the reaction pressure acting on the pressure surfaces of the piston skirt 39 and of the plunger piston 43 so that this piston part 39 is fixedly supported at the retaining ring 44 and at the control slide or spool-valve member 28. As a result thereof, the effective pressure area is reduced by the annular surface of the piston skirt 39 and the further shape of portion 53–54 of the manual force curve 52 is more flat. At the point 54 of the manual force curve 52, the plunger piston 43 is supported with surface 49 at the piston shirt 39 and therewith is also rigidly supported at the control slides or spool-valve element 28 so that also the reaction pressure force of the plunger on the control slide or spool-valve element 28 is turned off or rendered ineffectual and the manual force curve 52 receives, according to the present invention, a second bend (point 54) within the range of the servo-assist. Only the springs 45 and 50 still counteract a further deflection of the control slide or spool-valve element 28, whose resultant spring stiffness determines the rise of the manual force curve within the range 56 of the so-called hand force limitation.

The curve 57 in FIG. 4 illustrates the shape of the curve of the manual force against the steering shaft moment in the known servo-steering system of the aforementioned DAS 1,291,266. The point of the bend 58 of this curve represents the point where one of the two parts of the reaction pistons displaceable relative to one another is turned off, or rendered ineffectual, whereby the pressure area of the other piston part directly rigidly supported at the valve housing continues to remain effective in the adjoining curve section 59 and maintains a proportional dependence between load pressure and manual force that cannot be disengaged.

The curve 60 in FIG. 4 reproduces the shape of the curve of the manual force against the steering shaft moment in the known servo-steering system of the German DAS 1,034,991, corresponding to U.S. Pat. No. 2,985,145. A unitary reaction piston made of one part is provided in this servo-steering system, which is rigidly supported at the control slide or spool-valve member at the point 61 of the curve so that the reaction pressure is turned off at this point. The curve range 62 adjoining the point 61 represents the so-called manual force limitation whose flat configuration is determined by cup springs connected between reaction piston and valve housing.

As is clear from a comparison of the curves 52 and 60, the beginning of the manual force limitation (point 54 compared to point 61) is displaced by the present invention into the range of higher steering shaft moment so that the feel of the "falling into the curve" is avoided at the driver, when driving through curves, whereby simultaneously for facilitating the parking, etc., to the maximum manual force can be reduced.

No means for limiting the manual force are provided in the servo-steering system described in the aforementioned DAS 1,291,225 (curve 57).

FIG. 3 illustrates a modified embodiment of the servo-steering device according to the present invention, which functionally differs from the arrangement of FIG. 2 essentially, in that the springs 45a and 50a for the support of the piston skirt 39a and of the plunger piston 43a are connected in series by way of the valve housing wall 38a. Otherwise, the construction and operation of this embodiment is the same as illustrated in FIGS. 1 and 2.

While we have shown and described two embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A servo-steering system for vehicles with a servo-motor assisting the manual force at a steering wheel, which is controlled by way of a control slide valve means in dependence on a transmitter means responding to the movements of the steering wheel, and in which a reaction pressure derived from the load pressure and counteracting the manual force is rendered between a valve spool means of the control slide valve means and a reaction piston means supporting itself against the valve housing, and in which the reaction piston means includes a first piston part with a first piston pressure surface acted upon by the reaction pressure and a second piston part movable relative to the first piston part and provided with a second piston pressure surface also acted upon by the reaction pressure, the first piston part being supported against the valve housing by way of first elastic means and being rigidly engageable with the valve spool means after relative movement with respect to said valve spool means against the force of said first elastic means, said second piston part being supported with respect to the valve housing by second elastic means connected between the second piston part and the valve housing, the second piston part being rigidly supported at the valve spool means by the reaction pressure after overcoming the second elastic means.

2. A servo-steering system according to claim 1, characterized in that said first piston part is constructed as a piston pot open at the end surface thereof facing the adjacent valve housing wall, said piston pot being provided with a bore which connects the interior space of said piston pot with the associated reaction pressure space of the valve spool means, and in that said second piston part is constructed with a rod-shaped portion which is guided in said bore in a pressure-tight and displaceable manner.

3. A servo-steering system according to claim 2, characterized in that the first elastic means and the second elastic means are connected in parallel with respect to one another.

4. A servo-steering system according to claim 3, characterized in that the second elastic means, in the normal rest position of said second piston part unloaded by any pressure medium, engages simultaneously at both piston parts.

5. A servo-steering system according to claim 2, characterized in that the first and second elastic means are connected in series with respect to one another.

6. A servo-steering system according to claim 1, characterized in that the first elastic means and the second elastic means are connected in parallel with respect to one another.

7. A servo-steering system according to claim 6, characterized in that the second elastic means, in the normal rest position of said second piston part unloaded by any pressure medium, engages simultaneously at both piston parts.

8. A servo-steering system according to claim 1, characterized in that the first and second elastic means are connected in series.

9. A servo-steering system according to claim 1, wherein said first piston part is constructed pot-shaped with an annular sidewall portion having one end facing the adjacent housing wall and opposite the reaction pressure direction and having the other end closed by a bottom portion interconnecting said sidewalls, wherein the inwardly facing surfaces of said sidewalls define an interior space therebetween, wherein a bore is provided in said bottom portion which leads from the surface of the bottom portion facing oppositely of the adjacent housing wall into the interior space, and wherein said second piston part includes a rod-shaped portion guided in said bore in a pressure-tight and displaceable manner.

10. A servo-steering system according to claim 9, wherein said first elastic means includes a first spring member extending through at least a portion of the interior space and having one end in abutting engagement with the bottom portion of said piston and the other end rigidly engageable with the adjacent housing wall.

11. A servo-steering system according to claim 10, wherein a support piston is provided which has one end directly rigidly engaging the adjacent housing wall and the other end engaging said first spring member, said support piston being displaceably guided in said interior space.

12. A servo-steering system according to claim 10, wherein said second elastic means includes a second spring member arranged in said interior space concentrically to said first spring member, one end of said second spring member engaging the second piston part and the other end thereof being rigidly engageable with the adjacent housing wall.

13. A servo-steering system according to claim 12, wherein said one end of said second spring also engages a portion of said first piston part which faces oppositely to said reaction pressure.

14. A servo-steering system according to claim 12, wherein a support piston is provided which has one end directly rigidly engaging the adjacent housing wall and the other end engaging said first spring member, said support piston being displaceably guided in said interior space.

15. A servo-steering system according to claim 14, wherein said other end of said second spring rigidly engages said support piston.

16. A servo-steering system according to claim 9, wherein said annular sidewalls are cylindrically shaped.

17. A servo-steering system according to claim 1, wherein said first piston part is constructed pot-shaped with an annular sidewall portion having one end facing oppositely of the adjacent housing walls and in the same direction as the reaction pressure and having the other end closed off by a bottom portion interconnecting said sidewalls, wherein the inwardly facing surfaces of said sidewalls define an interior space therebetween, wherein a bore is provided in said bottom portion which leads from said interior space to the end of said first piston part facing the adjacent housing wall, and wherein said second piston part includes a rod-shaped portion guided in said bore in a pressure-tight and displaceable manner.

18. A servo-steering system according to claim 17, wherein said first elastic means includes a first spring member arranged in said interior space and having one end in rigid engagement with said first piston part and the other end in rigid engagement with said second piston part.

19. A servo-steering system according to claim 18, wherein said second elastic means includes a second spring member having one end in rigid engagement with said second piston part and the other end in rigid engagement with said adjacent housing wall.

20. A servo-steering system for vehicles with a servo-motor assisting the manual force at a steering wheel, comprising a control slide valve means controlling said servo motor in dependence of a transmitter means responding to movements of the steering wheel, said control valve means including a valve housing means, valve spool means within said valve housing means and reaction piston means, a reaction pressure derived from the load pressure and counteracting the manual force being rendered effective between the spool valve means and a respective reaction piston means, said reaction means including a first piston part and a second piston part movable relative to said first piston part, said first piston part being supported at the valve housings means by ways of first elastic means and being rigidly engageable with the valve spool means after relative movement with respected to the valve spool means against the force of the first elastic means, and second elastic means between said second piston part and said valve housing means, said second piston part being rigidly supported at said valve spool means after overcoming the second elastic means by the reaction pressure.

21. A servo-steering system according to claim 20, characterized in that the first elastic means and the second elastic means are connected in parallel.

22. A servo-steering system according to claim 21, characterized in that the second elastic means in the normal rest position of the second piston part unloaded by any pressure medium, engages simultaneously at both piston parts.

23. A servo-steering system according to claim 20, characterized in that the first and second elastic means are connected in series.

24. A servo-steering system according to claim 23, characterized in that the second elastic means engages at said first piston part and at the second piston part with the latter in the normal rest position relieved from any pressure medium.

25. A servo-steering system according to claim 20, characterized in that the second elastic means engages at said first piston part and at the second piston part with the latter in the normal rest position relieved from any pressure medium.

* * * * *